United States Patent [19]

Westermann et al.

[11] Patent Number: 4,502,892

[45] Date of Patent: Mar. 5, 1985

[54] METHOD FOR CLEANING A GLASS SURFACE WITH SOLUTIONS OF DISSOLVED PELLETED COMPONENTS CONTAINING HIGH MOLECULAR WEIGHT POLYPHOSPHATES, CARBONATES AND ACID-FORMING SUBSTANCES

[75] Inventors: Lothar Westermann, Cologne; Horst-Dieter Wasel-Nielen; Günter Sorbe, both of Hürth, all of Fed. Rep. of Germany

[73] Assignee: Hoechst Aktiengesellschaft, Fed. Rep. of Germany

[21] Appl. No.: 504,834

[22] Filed: Jul. 13, 1983

Related U.S. Application Data

[63] Continuation of Ser. No. 104,539, Dec. 17, 1979, abandoned.

[30] Foreign Application Priority Data

Dec. 27, 1978 [DE] Fed. Rep. of Germany ....... 2856143

[51] Int. Cl.[3] .......................... B60S 1/04; B60S 1/48; C11D 3/065; C11D 17/00

[52] U.S. Cl. ........................................ 134/6; 252/135; 252/136; 252/174; 252/174.14; 252/174.19; 252/174.21; 252/350; 252/535; 252/536; 252/539; 252/DIG. 10

[58] Field of Search ............... 252/135, 136, DIG. 10; 106/13; 134/2, 3, 6

[56] References Cited

U.S. PATENT DOCUMENTS

| | | | |
|---|---|---|---|
| 1,956,515 | 4/1934 | Hall | 252/135 |
| 2,566,424 | 9/1951 | Munter | 252/135 |
| 3,304,264 | 2/1967 | Durbin | 134/6 |
| 3,321,406 | 5/1967 | Shen | 252/135 |
| 3,423,025 | 1/1969 | Rodger | 134/6 X |
| 3,463,735 | 8/1969 | Stonebraker | 252/523 |

*Primary Examiner*—Dennis L. Albrecht
*Attorney, Agent, or Firm*—Connolly and Hutz

[57] ABSTRACT

The invention relates to a composition suitable for use in cleaning panes of glass, consisting of a pelleted blend of surfactants, the composition containing:

(a) a water-soluble alkali metal polyphosphate of high molecular weight with a $P_2O_5$-content of 60 to 70 weight %;

(b) at least one alkali metal carbonate or hydrogen-carbonate;

(c) at least one crystalline substance producing an acid reaction in aqueous solution;

(d) at least one anion-active and/or non-ionic surfactant; and (e) at least one filler, if desired or convenient.

15 Claims, No Drawings

METHOD FOR CLEANING A GLASS SURFACE WITH SOLUTIONS OF DISSOLVED PELLETED COMPONENTS CONTAINING HIGH MOLECULAR WEIGHT POLYPHOSPHATES, CARBONATES AND ACID-FORMING SUBSTANCES

This application is a continuation of copending application Ser. No. 104,539 filed Dec. 17, 1979, now abandoned.

The present invention relates to a glass-pane cleaning composition consisting of a pelleted blend of surfactants, the composition being suitable for use in cleaning the windshields of motor vehicles and being preferably employed in a windshield washer mechanism.

It has already been proposed that phosphates and/or surfactants and/or alcohols and/or glycols should be used as ingredients of liquid, pasty or solid pulverulent cleaning compositions. If used in the form of an aqueous solution and in the high concentration of about 50 to 500 ml or gram per liter of water, they permit dirt to be more or less completely removed from the windshield of a motor vehicle by means of a windshield washer mechanism.

Pelleted cleaning compositions which are based on surfactants and/or fillers or pelleting auxiliaries and capable of dissolving automatically in the water of a windshield washer mechanism have also been described in the literature.

These are, however, not fully satisfactory in respect of the following. They are free from builder and more importantly from phosphate and therefore unable, in the form of an aqueous and/or alcoholic solution, reliably to clean the windshield of a motor-vehicle.

In addition to this, surfactants which are sensitive to agents inducing the hardness of water may cause turbidity in the aqueous medium and/or cause material to precipitate therein. As a result, the cleaning power is further reduced and the cleaning composition is liable to form non-transparent streaks or to leave residues on the windshield which naturally adversely effect the necessary good vision. Pulvervulent cleaning compositions are not easy to handle inasmuch as it is necessary for them to be initially dissolved in order to prevent pump and nozzle structures forming part of the windshield washer mechanism from becoming clogged therewith. In addition to this, the cleaning compositions just described tend to cause turbidity in an alcoholic aqueous medium which in the end gives rise to the formation of white nontransparent films on the windshield of the motor vehicle.

It is therefore an object of the present invention to provide a cleaning composition, which can reliable be made into pellets, dissolves automatically and rapidly in an aqueous medium, with or without alcoholic and/or glycol-containing antifreezing agent admixed therewith, to give a clear solution which is free from residues and permits a good cleaning effect to be produced on the windshields of motor vehicles.

According to the present invention, we now unexpectedly provide a glass-pane composition consisting of a pelleted blend of surfactants, the composition containing:

(a) a water-soluble alkali metal polyphosphate of high molecular weight with a $P_2O_5$-content of 60 to 70 weight %;

(b) at least one alkali metal carbonate or hydrogen-carbonate;

(c) at least one crystalline substance producing an acid reaction in an aqueous solution;

(d) at least one anion-active and/or non-ionic surfactant; and (e) at least one filler, if desired or convenient.

Very good cleaning effects are produced with compositions containing, individually or collectively:

as polyphosphate of high molecular weight (component a) Graham salt;

as alkali metal hydrogen-carbonate (component b) sodium hydrogen carbonate;

as substance producing an acid reaction (component c) sulfamic acid or an organic acid, such as tartaric acid or malic acid or preferably citric acid or citric acid-monohydrate;

as surfactant (component d) an anion-active surfactant, such as secondary n-alkane-sulfonate having 13 to 18 carbon atoms, an alkylbenzene-sulfonate with an unbranched $C_{10}$-$C_{13}$-hydrocarbon chain, or an olefin sulfonate with an alkenyl group of 10 to 18 carbon atoms or a non-ionic surfactant, such as a fatty alcohol-polyglycolether oxethylate with 12 to 18 carbon atoms and 3 to 25 mols of ethylene oxide or alkylarylpolyether alcohol with 1 to 10 carbon atoms in the alkyl group and 4 to 30 mols of ethylene oxide, preferably octylphenoxypolyethoxy ethanol with 5 mols of ethylene oxide; and, if desired:

as a filler (component e) at least one low molecular alkali metal phosphate, such as disodium-dihydrogen-diphosphate, trisodium-monophosphate, tripotassium-monophosphate, trisodium-hydrogen-diphosphate, tatrasodium-diphosphate or, preferably, pentasodium-triphosphate and/or an alkali metal sulfate, such as sodium sulfate, the alkali metal phosphate and alkali metal sulfate being used individually or in admixture with one another, preferably in the form of a hot spray mixture containing pentasodium triphosphate and sodium sulfate in a ratio by weight of about 1:1.

In accordance with a preferred feature of the present invention, the cleaning compositions should contain the individual components in the following proportions, in weight %:

component (a): 10 to 90, preferably 30 to 50,
component (b): 2.5 to 35, preferably 15 to 25,
component (c): 2.5 to 35, preferably 15 to 25,
component (d): 1 to 20, preferably 3 to 10, and
component (e): up to 30, preferably 5 to 15.

Cleaning compositions containing 30 to 50 weight % of components (b) and (c) in the form of a blend of citric acid-monohydrate and sodium hydrogen-carbonate in a ratio by weight of 2:1 to 1:2 have proved very effective. The pellets dissolve readily in water and produce a good bright finish effect on the windshield.

The cleaning compositions of the present invention can be made, for example, as follows: A high molecular alkali metal phosphate and/or a hot spray mixture consisting of low molecular alkali metal phosphate and alkali metal sulfate has a liquid or pasty surfactant or surfactant mixture sprayed thereonto with the use of a suitable nozzle structure, or has a pulverulent surfactant together with other ingredients admixed therewith with the use of a suitable mixer, the resulting mixture being made into pellets on a pelleting press.

The present cleaning compositions compare favorably with the prior art products in respect of the following: They can be used in low concentration, preferably 1 g per liter of water. Despite this, they permit oil and pigment dirt to be effectively removed, in the region of the wiping range of the windshield wipers, from the windshield which remains fully transparent. The pelleted cleaning compositions also compare favorably with the prior art products in respect of the following: They dissolve automatically and rapidly to clear solutions free from residues which are not liable to corrode any of the automobile body materials and are reliably compatible with all current antifreezing agents.

A highly beneficial effect which would not have been expected by the expert in this art resides in the fact that an aqueous solution containing 1 g of cleaning composition per liter of aqueous medium is freeze-resistant down to about −10° C.

The following Examples illustrate the invention which however is not limited thereto.

EXAMPLE 1

(1) 35 parts by weight of a high molecular, water-soluble polyphosphate containing about 68% $P_2O_5$,
(2) 23 parts by weight of sodium hydrogen-carbonate,
(3) 22 parts by weight of citric acid-monohydrate,
(4) 5 parts by weight of an olefin sulfonate with 15 to 18 carbon atoms in the alkenyl group,
(5) 7.5 parts by weight of pentasodium triphosphate,
(6) 7.5 parts by weight of sodium sulfate or, instead of components (5) and (6),
(7) 15 parts by weight of a hot spray mixture of pentasodium triphosphate and sodium sulfate in a mixing ratio of about 1:1, were placed in a mixer, mixed therein and then made into pellets of about 1 g on a pelleting press.

EXAMPLE 2

A 1 g pellet of the cleaning composition of Example 1 was dissolved in 1 liter of water with a hardness of about 14° (German degrees of hardness) and the solution was applied to the surface of differently lacquered automobile metal sheets. The lacquered surfaces could not be found to have been impaired in contact with the solution after 48 hours. In another test, rubber packings, aluminum ornamental ledges, parts of plastics materials and chromed parts of the automobile body of passenger vehicles were immersed in the solution over a period of 48 hours. Once again, the materials could not be found to have been corroded after that time.

EXAMPLE 3

The cleaning composition of Example 1 was diluted with water in the ratio of 1:1000 and the resulting aqueous solution was tested as to its cleaning power under practice conditions during prolonged tours of vehicles. Visual inspection of the windshields indicated that they had been completely cleaned in the region of the wiping range of the windshield wipers, were free from streaks and of optimum transparency.

EXAMPLE 4

1 g of the cleaning composition of Example 1 was dissolved in 1 liter of water with a hardness of 10° (German degrees of hardness). The resulting aqueous solution was mixed in a ratio by volume of 2:1 with various current antifreezing agents and the various mixtures were inspected after 8 and 48 hours, respectively, at 20° and 0° C., respectively, for precipitated matter. None of the various mixtures could be found to have been rendered turbid or affected.

EXAMPLE 5

1 g of the pelleted cleaning composition of Example 1 was dissolved in 1 liter of tap water with a hardness of about 15° (German degrees of hardness) and the resulting solution was tested for its pour point as described in DIN-specification (DIN stands for German Industrial Standard) No. 51 583. The freeze point was found to have been reduced down to about −9° to −10° C. This was an unexpected result in view of the following: Prior art cleaning pellets diluted with water in the same ratio permitted the freeze point to be reduced down to at most −4° C.

EXAMPLE 6

1 g pellet of the cleaning composition of Example 1 was placed in 1 liter of stationary water and its automatic dissolution rate was determined. It was 8 minutes at a pH of about 6.8 almost equal to the neutral point.

Pelleted prior art products needed about 15 minutes for dissolution and this despite a low pH-value of about 5.0 under otherwise the same conditions.

We claim:

1. A method for cleaning the windshields of motor vehicles by means of a windshield washer mechanism, comprising the steps of:

dissolving in an aqueous medium in said windshield washer mechanism at least one solid pellet comprising the following pelleted components:

(a) a water-soluble alkali metal polyphosphate of high molecular weight with a $P_2O_5$-content of 60 to 70 weight % in a proportion of 10 to 90 weight %;
(b) at least one alkali metal carbonate or hydrogen-carbonate in a proportion of 2.5 to 35 weight %;
(c) at least one crystalline substance producing an acid reaction in aqueous solution in a proportion of 2.5 to 35 weight %;
(d) at least one anion-active and/or non-ionic surfactant in a proportion of 1 to 20 weight %; and
(e) at least one filler selected from the group consisting of low molecular alkali metal phosphates and alkali metal sulfate in a proportion of 5 to 15 weight %, thereby obtaining an aqueous glass cleaning composition, and cleaning the windshield with the resulting aqueous glass cleaning composition.

2. A method according to claim 1, wherein the solid pellet comprises:

component (a) in a proportion of 30 to 50 weight %,
component (b) in a proportion of 15 to 25 weight %,
component (c) in a proportion of 15 to 25 weight %,
component (d) in a proportion of 3 to 10 weight %, and
component (e) in a proportion of 5 to 15 weight %.

3. A method according to claim 2, wherein the solid pellet contains 30 to 50 weight % of a mixture of citric acid and sodium hydrogen carbonate in a mixing ratio of 2:1 to 1:2 as components (b) and (c).

4. A method according to claim 1, comprising the steps of:

dissolving at least one solid pellet in a sufficient amount of aqueous medium to provide a concentration of the dissolved pelleted components which is effective for cleaning glass but does not exceed 50 grams per liter of aqueous medium, and obtaining an aqueous cleaning solution substantially free of turbidity and precipitated solids, pumping the resulting aqueous cleaning solution through a windshield washer mechanism onto the glass surface of the windshield, and wiping the aqueous cleaning solution thus applied to the windshield from the glass surface of the windshield with the aid of a windshield wiper.

5. A method according to claim 4 wherein the aqueous medium used to obtain the aqueous cleaning solution further contains an alcoholic or glycol-containing antifreezing agent.

6. A method according to claim 4, wherein the aqueous medium used to obtain the aqueous cleaning solution comprises tap water.

7. The method of claim 1 wherein said pelleted components contain Graham salt as the molecular polyphosphate of high molecular weight.

8. The method of claim 1, wherein the said pelleted components contain sodium hydrogen-carbonate as the alkali metal hydrogen-carbonate.

9. The method of claim 1, wherein the said pelleted components contain an organic acid as the crystalline substance producing an acid reaction.

10. The method of claim 9, wherein said organic acid is tartaric acid or malic acid.

11. The method of claim 9, wherein said organic acid is citric acid or citric acid-monohydrate.

12. The method of claim 1, wherein the said pelleted components contain sulfamic acid as the crystalline substance producing an acid reaction.

13. The method of claim 1, wherein said pellet components contain a secondary n-alkane-sulfonate with 13 to 18 carbon atoms, an alkylbenzene sulfonate with an unbranched $C_{10}$ to $C_{13}$ hydrocarbon chain or olefin sulfate with 10 to 18 carbon atoms in the alkenyl group as an anion-active surfactant.

14. The method of claim 1, wherein said pelleted-components contain a fatty alcohol-polyglycolether-oxethylate with 12 to 18 carbon atoms and 3 to 25 mols of ethylene oxide, or an alkylarylpolyether alcohol with 1 to 10 carbon atoms in the alkyl group and 4 to 30 mols of ethylene oxide, as a non-ionic surfactant.

15. The method of claim 1, wherein said pelleted components contain at least one low molecular alkali metal phosphate or alkali metal sulfate or mixtures thereof as a filler.

* * * * *